(12) United States Patent
Hung

(10) Patent No.: US 10,159,345 B2
(45) Date of Patent: Dec. 25, 2018

(54) DISPLAY SUPPORTING APPARATUS

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 342 days.

(21) Appl. No.: 15/134,613

(22) Filed: Apr. 21, 2016

(65) Prior Publication Data
US 2017/0127833 A1    May 11, 2017

(30) Foreign Application Priority Data

Nov. 10, 2015 (TW) .............................. 104217971 U

(51) Int. Cl.
| | |
|---|---|
| *F16M 11/10* | (2006.01) |
| *F16M 11/04* | (2006.01) |
| *F16M 11/18* | (2006.01) |
| *F16M 11/20* | (2006.01) |
| *F16M 11/38* | (2006.01) |
| *A47B 97/00* | (2006.01) |
| *F16M 11/12* | (2006.01) |
| *F16M 11/16* | (2006.01) |
| *F16M 13/02* | (2006.01) |

(52) U.S. Cl.
CPC ......... *A47B 97/001* (2013.01); *F16M 11/041* (2013.01); *F16M 11/043* (2013.01); *F16M 11/048* (2013.01); *F16M 11/12* (2013.01); *F16M 11/16* (2013.01); *F16M 11/18* (2013.01); *F16M 11/2085* (2013.01); *F16M 11/2092* (2013.01); *F16M 11/38* (2013.01); *F16M 13/02* (2013.01); *A47B 2097/005* (2013.01); *F16M 11/10* (2013.01); *F16M 2200/048* (2013.01); *F16M 2200/061* (2013.01)

(58) Field of Classification Search
CPC .... F16M 13/02; F16M 11/10; F16M 11/2092; F16M 2200/061; F16M 2200/048; F16M 11/048; F16M 11/18; A47B 97/01
USPC ............ 248/201, 122.1, 274.1, 277.1, 287.1, 248/286.1, 291.1, 917; 361/679.01
See application file for complete search history.

(56) References Cited

U.S. PATENT DOCUMENTS

| | | | | |
|---|---|---|---|---|
| 4,764,075 A | * | 8/1988 | Cox .......................... | B65G 1/07 108/136 |
| 5,394,959 A | * | 3/1995 | Cullity ...................... | B66B 9/16 180/414 |
| 8,094,438 B2 | * | 1/2012 | Dittmer ................... | F16M 11/10 248/125.7 |
| 8,333,355 B2 | * | 12/2012 | Stifal ...................... | F16M 11/10 248/276.1 |
| 9,109,742 B2 | * | 8/2015 | Smith ..................... | F16M 11/10 |
| 9,546,756 B1 | * | 1/2017 | Hung ................... | F16M 11/041 |

(Continued)

*Primary Examiner* — Tan Le
(74) *Attorney, Agent, or Firm* — Burris Law, PLLC

(57) ABSTRACT

A display supporting apparatus includes a supporting unit having first and second support frames, and a resilient mechanism having a guide member, a slide member removably and slidably engageable with the guide member, and a resilient member. The supporting unit is operable between folded and unfolded states, in which the first and second support frames are moved toward and away from each other, respectively. The resilient member is compressed between the first and second support frames when the supporting unit is in the folded state.

9 Claims, 15 Drawing Sheets

(56) References Cited

U.S. PATENT DOCUMENTS

2002/0179791 A1* 12/2002 Kwon .................... F16M 11/10
                                                    248/284.1
2006/0244870 A1* 11/2006 Yamato .................. E05B 51/02
                                                    348/836

* cited by examiner

DISPLAY SUPPORTING APPARATUS

CROSS-REFERENCE TO RELATED APPLICATION

This application claims priority of Taiwanese Patent Application No. 104217971, filed on Nov. 10, 2015.

FIELD

The disclosure relates to a supporting apparatus, and more particularly to a display supporting apparatus.

BACKGROUND

An existing display supporting apparatus for mounting a display thereto can change its position only along a single direction, and is inconvenient to adjust to an optimal viewing position. When multiple displays are respectively mounted on the display supporting apparatuses, the position of each display can be adjusted by adjusting the position of the respective display supporting apparatus. Further, the position and fixing of each display supporting apparatus must be planned ahead as it is difficult to change its position afterwards. Thus, the displays may be irregularly arranged. In addition, after mounting the displays on the respective display supporting apparatuses, because the displays are quite near a wall surface or a wall-hanging frame, it is difficult to repair or replace a damaged display.

SUMMARY

Therefore, an object of the present disclosure is to provide a display supporting apparatus that can be conveniently assembled and adjusted to a desired position.

According to this disclosure, a display supporting apparatus includes a supporting unit and a resilient mechanism.

The supporting unit includes a first support frame, a second support frame for mounting a display thereon, and a linkage mechanism pivotally connected to and disposed between the first and second support frames. The resilient mechanism includes a guide member mounted on one of the first and second support frames, a slide member pivotally connected to the other one of the first and second support frames, and a resilient member. The slide member is removably and slidably engageable with the guide member. The supporting unit is operable between folded and unfolded states, in which the first and second support frames are moved toward and away from each other, respectively. When the supporting unit is in the folded state, the slide member is engaged with the guide member, the second support frame is proximate to the first support frame, and the resilient member is compressed between the first and second support frames to store a biasing force. When the supporting unit is in the unfolded state, the slide member is disengaged from the guide member, and the first and second support frames are biased by the biasing force of the resilient member to move away from each other.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
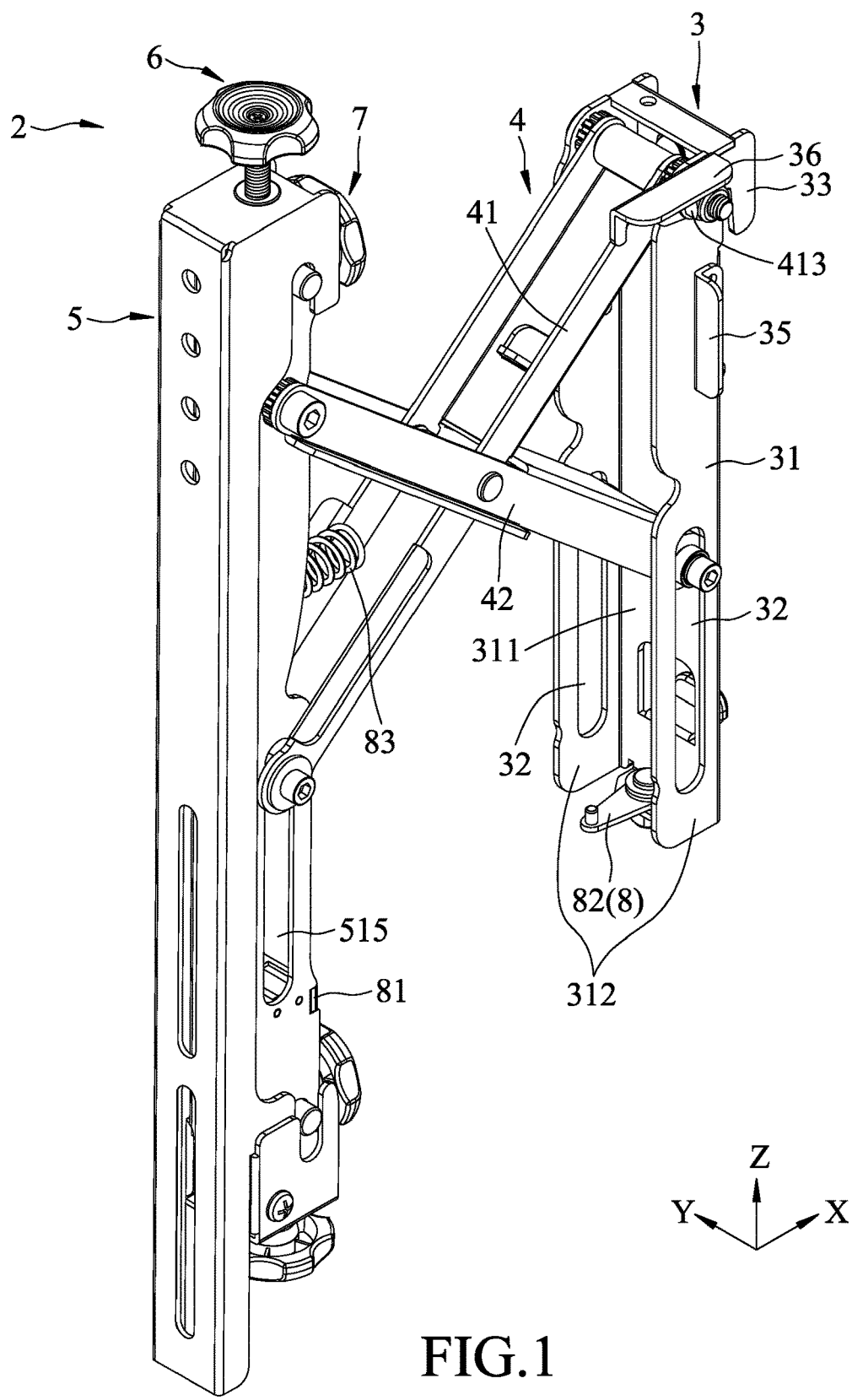
FIG. 1 is a perspective view of a display supporting apparatus according to an embodiment of the present disclosure.
Figure 2:
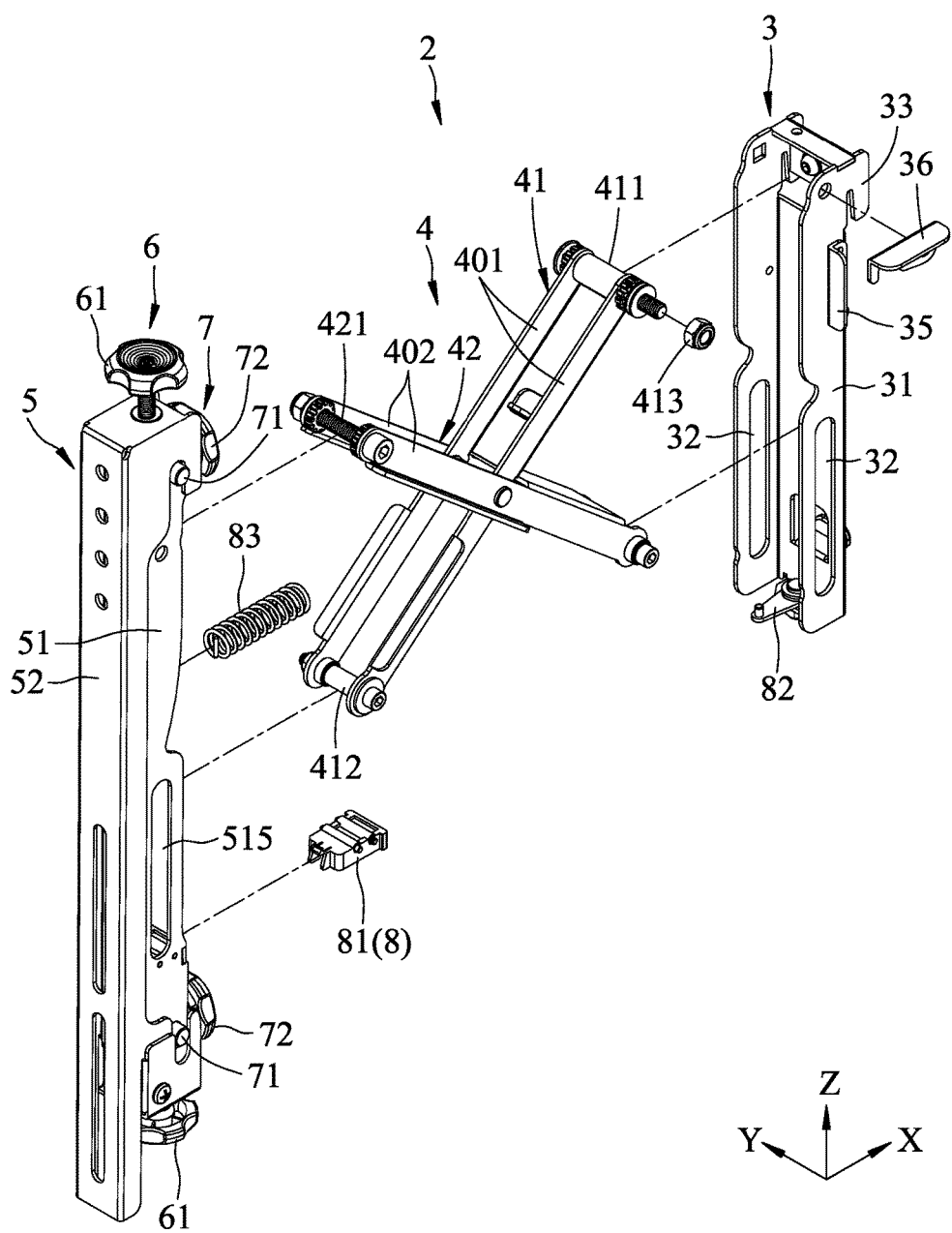
FIG. 2 is an exploded view of the embodiment.
Figure 3:
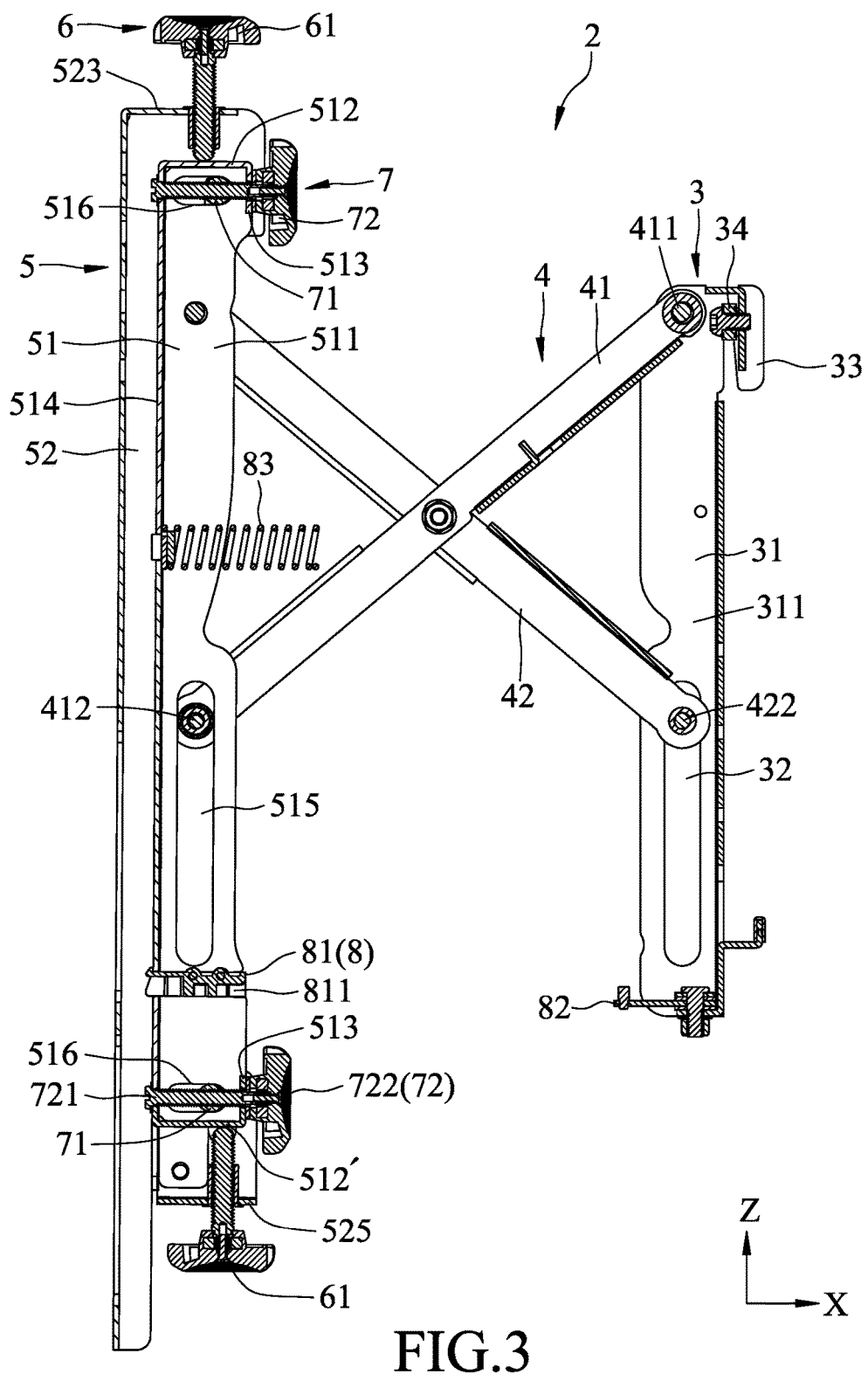
FIG. 3 is an assembled sectional view of the embodiment.

Referring to FIGS. 1 to 3, a display supporting apparatus according to an embodiment of this disclosure includes a supporting unit 2, first and second adjusting units 6, 7, and a resilient mechanism 8.

The supporting unit 2 includes a first support frame 3, a linkage mechanism 4, and a second support frame 5 for mounting a display 20 (see FIG. 12) thereon. The linkage mechanism 4 is pivotally connected to and is disposed between the first and second support frames 3, 5.

The first support frame 3 has a connection body 31, two spaced-apart hook-engaging plates 33, a roller 34, and an abutment member 35. The connection body 31 includes an elongated base wall 311 extending along a first direction (Z), two lateral walls 312 extending respectively and transversely from two opposite long ends of the base wall 311, and two symmetrical first grooves 32 respectively formed in the lateral walls 312 and respectively extending along the length of the lateral walls 312 in the first direction (Z). The hook-engaging plates 33 extend transversely and then downwardly from a short or top end of the base wall 311, and are respectively opposite to the lateral walls 312. The roller 34 is rotatably disposed on the base wall 311 between the hook-engaging plates 33. The abutment member 35 is pivoted to an outer side of one of the lateral walls 312.

The linkage mechanism 4 includes first and second linkage rods 41, 42 intersecting each other, pivotally connected to each other at their intersection, and having symmetrical structures. The first linkage rod 41 includes two parallel first rod sections 401, a first pivot bolt 411 having two opposite ends extending through top ends of the first rod sections 401 and out of the respective lateral walls 312 in proximity to top ends thereof, and a first slide bolt 412 opposite to the first pivot bolt 411 and slidably disposed on the second support frame 5. The first support frame 3 further has a retaining member 36 sleeved on one end of the first pivot bolt 411. A nut 413 is threadedly connected to the one end of the first pivot bolt 411 to loosenably fix the retaining member 36 to the outer side of the one of the lateral walls 312. The retaining member 36 is located above the abutment member 35. The second linkage rod 42 includes two parallel second rod sections 402, a second pivot bolt 421 pivotally connected to the second support frame 5, and a second slide bolt 422 having two opposite ends extending through bottom ends of the second rod sections 402 and out of the respective first grooves 32 such that the bottom ends of the second rod sections 402 are slidable upward and downward along the first grooves 32 through the second slide bolt 422.

Figure 4:
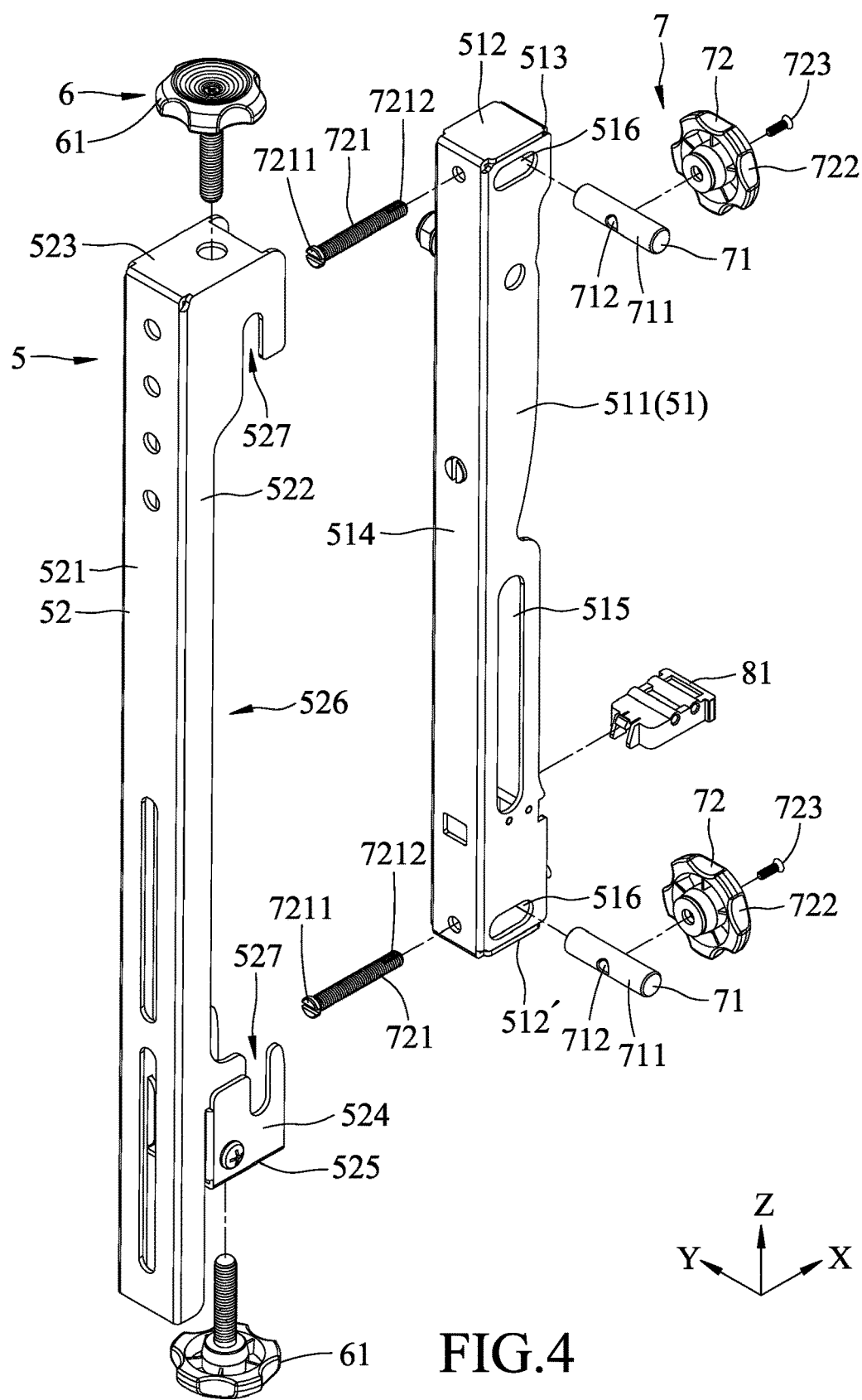
FIG. 4 is an exploded view of a second support frame and first and second adjusting units of the embodiment.
Figure 5:
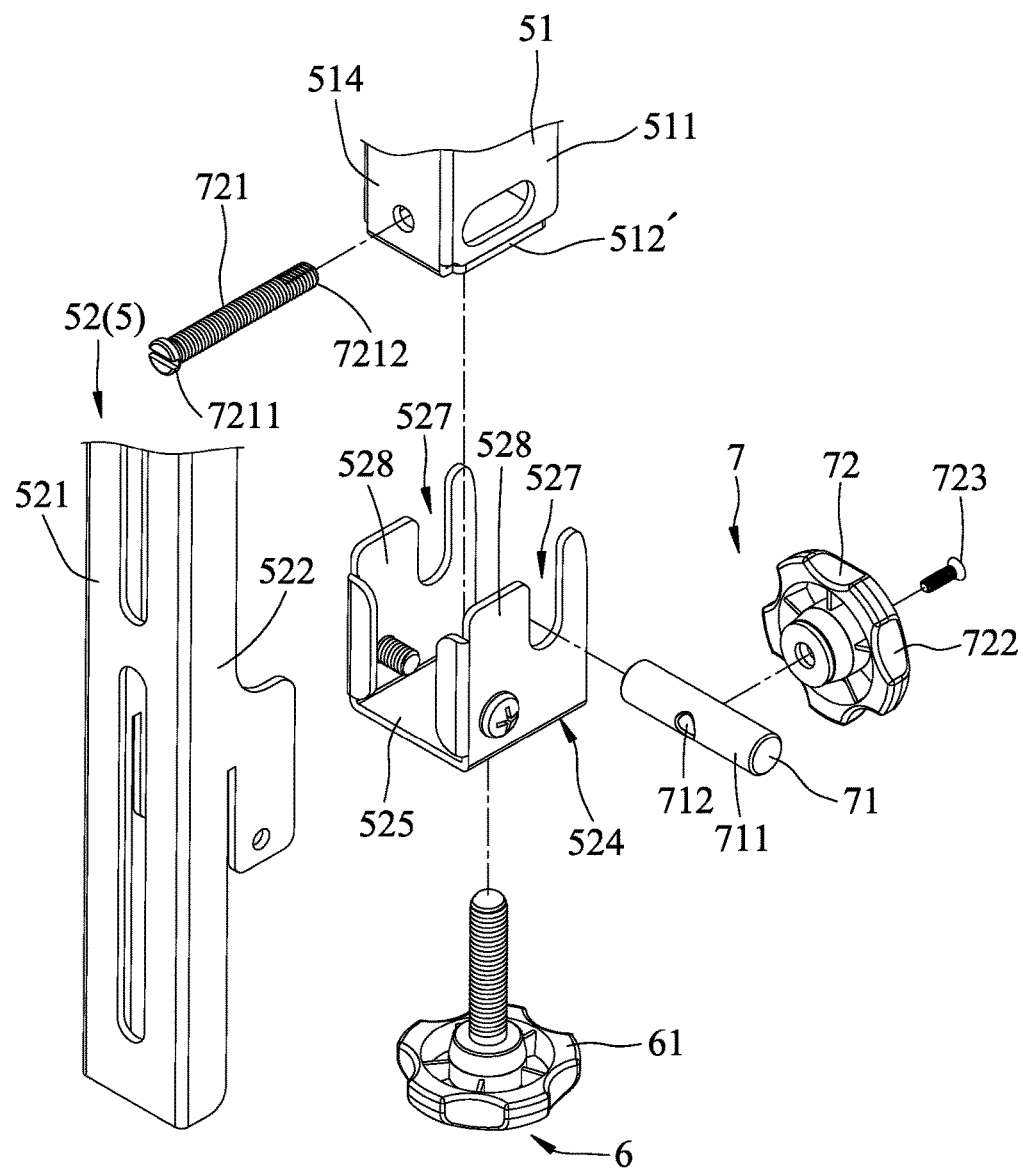
FIG. 5 is a fragmentary exploded view of the second support frame.
Figure 6:
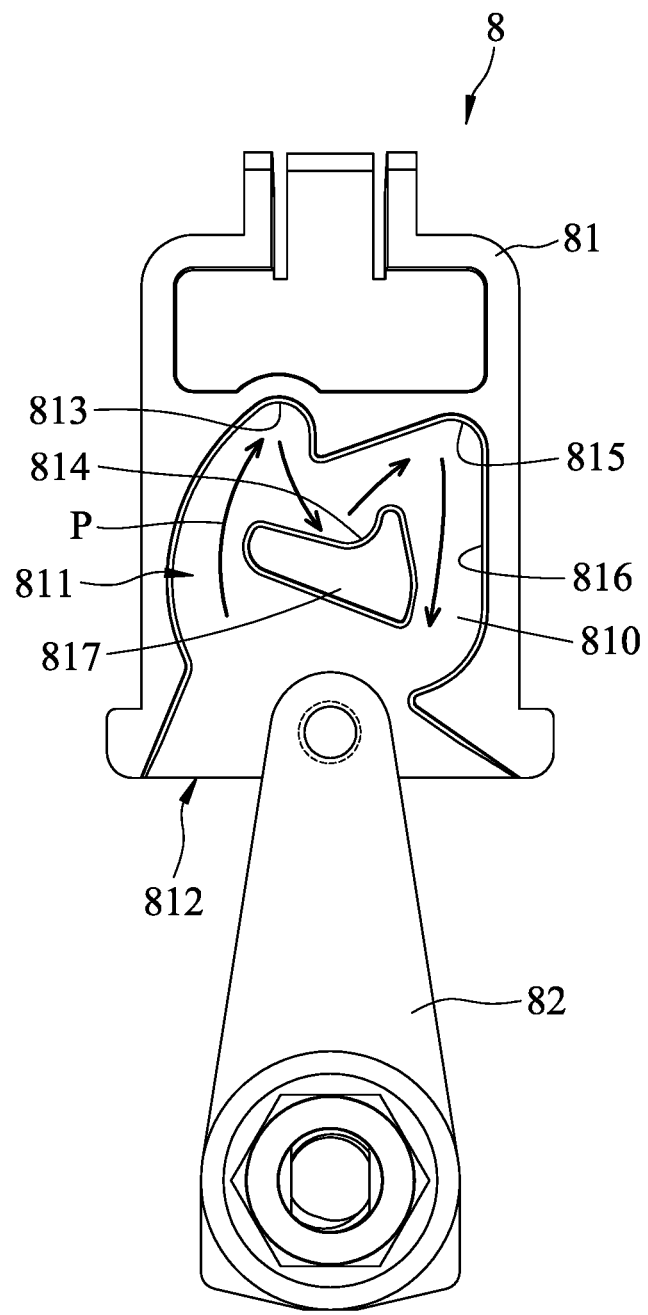
FIG. 6 is a bottom view of the embodiment, illustrating a slide member and a guide member of a resilient mechanism of the embodiment.

Referring to FIGS. 4 and 5, in combination with FIG. 3, the second support frame 5 includes an adjustable body 51 and a support body 52.

The adjustable body 51 includes two spaced-apart side walls 511 extending along the first direction (Z), a first end wall 512 connected between the side walls 511 at one end thereof, a second end wall 512' connected between the side walls 511 at the other end thereof, two abutment walls 513 connected respectively and transversely to the first and second end walls 512, 512', and a main wall 514 connected between the side walls 511 and between the first and second end walls 512, 512' opposite to the abutment walls 513. In addition, the adjustable body 51 has two pairs of first adjusting grooves 516 and two second grooves 515. The two pairs of the first adjusting grooves 516 are formed in the side walls 511 in proximity to the first and second end walls 512, 512', respectively, and are spaced apart from each other along the first direction (Z). Each of the first adjusting grooves 516 extends along a second direction (X) transverse to the first direction (Z). The first adjusting grooves 516 of each pair of the first adjusting grooves 516 are spaced apart from each other along a third direction (Y) transverse to the first and second directions (Z, X). The second grooves 515 are respectively formed in the side walls 511 between the pairs of the first adjusting grooves 516, and extend along the first direction (Z). The two opposite ends of the first slide bolt 412 extend through bottom ends of the first rod sections 401 and out of the respective second grooves 515, so that the bottom ends of the first rod sections 401 are slidable upward and downward along the second grooves 515 through the first slide bolt 412. The second pivot bolt 421 has two opposite ends extending through top ends of the second rod sections 402 and out of the respective side walls 511 in proximity to the first end wall 512. In this embodiment, the first direction (Z) is a vertical direction, and the second direction (X) is a horizontal direction.

The support body 52 includes a main supporting wall 521 extending along the first direction (Z) for mounting the display 20 (see FIG. 12) thereon, two supporting side walls 522 respectively connected to two long sides of the main supporting wall 521, a top wall 523 connected to one short side of the main supporting wall 521, and an assembly member 524 connected to the other short side of the main supporting wall 521. In this embodiment, to facilitate assembly, the assembly member 524 has a bottom wall 525 opposite to the top wall 523, and two spaced-apart lateral sides 528 that respectively extend from two opposite ends of the bottom wall 525 in the first direction (Z) and that are respectively and removably screwed to the supporting side walls 522. The main supporting wall 521, the supporting side walls 522, and the top and bottom walls 523, 525 cooperatively define an elongated receiving space 526 that receives the adjustable body 51. In addition, the support body 52 has two pairs of second adjusting grooves 527 spaced apart from each other along the first direction (Z). One pair of the second adjusting grooves 527 are respectively formed in the supporting side walls 522, and extend along the first direction (Z). The other pair of the second adjusting grooves 527 are respectively formed in the lateral sides 528 of the assembly member 524, and extend along the first direction (Z). Each pair of the second adjusting grooves 527 corresponds to a respective pair of the first adjusting grooves 516. Specifically, each pair of the second adjusting grooves 527 and the corresponding pair of the first adjusting grooves 516 are transverse to each other.

The first adjusting unit 6 includes two first adjustable members 61 that extend respectively and movably through the top and bottom walls 523, 525 and that respectively abut against the first and second end walls 512, 512'. In this embodiment, the first adjustable members 61 are connected threadedly and respectively to the top and bottom walls 523, 525, and are operable to move the support body 52 upward and downward along the first direction (Z) relative to the adjustable body 51.

The second adjusting unit 7 includes two sliding rods 71 each movably extending through one pair of the first adjusting grooves 516 and a corresponding pair of the second adjusting grooves 527, and two second adjustable members 72 each extending through and idly rotatable relative to the adjustable body 51. In this embodiment, each sliding rod 71 has a smooth outer surface 711 and a threaded hole 712 extending diametrically through the outer surface 711 at the center of a respective sliding rod 71. Each second adjustable member 72 includes a threaded shank 721 and a head 722. The threaded shank 721 extends through the main wall 514, the threaded hole 712 of the respective sliding rod 71 and out of a corresponding abutment wall 513. The threaded shank 721 has a first end 7211 limited at the main wall 514 externally of the adjustable body 51, and a second end 7212 opposite to the first end 7211. The head 722 is connected to the second end 7212 by a screw 723, and is limited at the corresponding abutment wall 513 externally of the adjustable body 51.

When the head 722 of one of the second adjustable members 72 is operated to rotate a respective threaded shank 721, rotation of the threaded shank 721 drives the respective sliding rod 71 to move along the second direction (X), which in turn drives one end of the support body 52 to move therealong. That is, the support body 52 is moved to incline with respect to the adjustable body 51 when one of the sliding rods 71 is driven by the respective threaded shank 721 to move along the second direction (X). Because each pair of the second adjusting grooves 527 and the corresponding pair of the first adjusting grooves 516 are transverse to each other, when the threaded shank 721 of one of the second adjustable members 72 is driven by the head 722 thereof to rotate, it can drive the respective sliding rod 71 to move along the second direction (X) and the relative movement between each pair of the second adjusting grooves 527 and the corresponding pair of the first adjusting grooves 516. Thus, when the second adjustable members 72 are simultaneously operated, the support body 52 can be driven to move horizontally with respect to the adjustable body 51; and when one of the second adjustable members 72 is operated, the support body 52 can be driven to incline with respect to the adjustable body 51.

Referring to FIGS. 6 to 9, in combination with FIGS. 2 and 3, the resilient mechanism 8 includes a guide member 81, a slide member 82 and a resilient member 83.

The guide member 81 is mounted on the adjustable body 51, and has a sliding groove 811 defined by a groove bottom wall 810 and a groove surrounding wall 816 extending outwardly and transversely from the groove bottom wall 810, and a projection member 817 projecting from the groove bottom wall 810 into the sliding groove 811 and spaced apart from the groove surrounding wall 816. The sliding groove 811 has an open end 812. The groove surrounding wall 816 has a first abutment portion 813 and a second abutment portion 815 spaced apart from the first abutment portion 813. The projection member 817 has an engaging portion 814 located between the first and second abutment portions 813, 815. The engaging portion 814 and the open end 812 are spaced at a distance smaller than that between the first abutment portion 813 and the open end 812 and between the second abutment portion 815 and the open end 812. The projection member 817 cooperates with the groove surrounding wall 816 to form an annular sliding path (P). The open end 812 communicates with the annular sliding path (P). The annular sliding path (P) extends from the open end 812 through the first abutment portion 813, through the engaging portion 814, through the second abutment portion 815, and back to the open end 812.

The slide member 82 is pivotally connected to the connection body 31 at a position corresponding to the guide member 81, and is removably and slidably engageable with the guide member 81. That is, the slide member 82 can be inserted into the sliding groove 811 through the open end 812 so as to be slidable in the sliding groove 811 along the annular sliding path (P), and can slide out of the sliding groove 811 also through the open end 812.

The resilient member 83 is mounted on the adjustable body 51 spaced apart from the guide member 81 in this embodiment. In some cases, the resilient member 83 may be mounted on the connection body 31. Similarly, the resilient member 83 can bias the first and second support frames 3, 5 away from each other. In this embodiment, the resilient member 83 is a compression spring.

In this embodiment, the guide member 81 is mounted on the adjustable body 51, while the slide member 82 is pivotally connected to the connection body 31. Alternatively, the guide member 81 may be mounted on the connection body 31, while the slide member 82 may be pivotally connected to the adjustable body 51.

Figure 10:
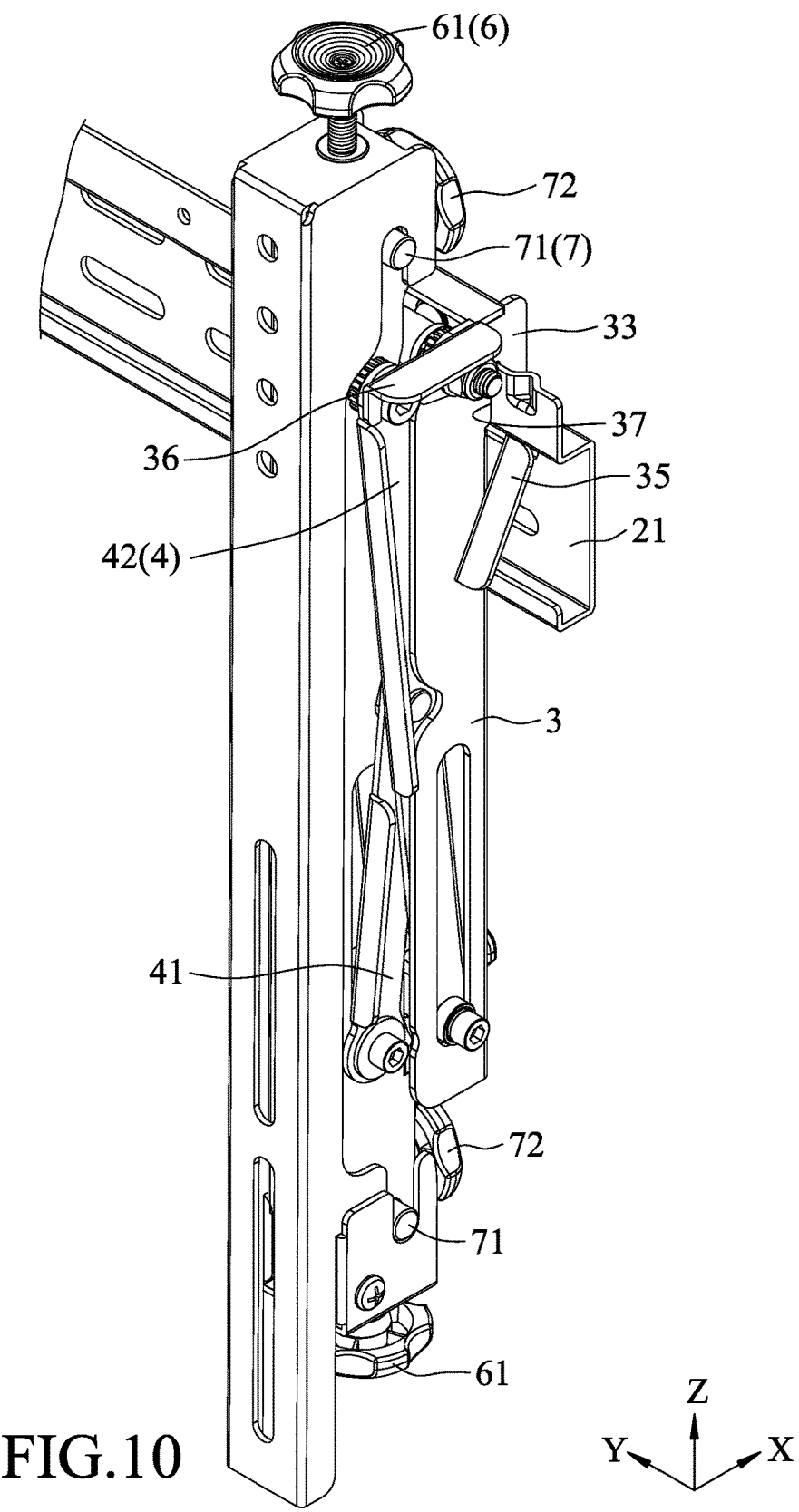
FIG. 10 is another perspective view of the embodiment, illustrating a supporting unit of the embodiment in a folded state.
Figure 11:
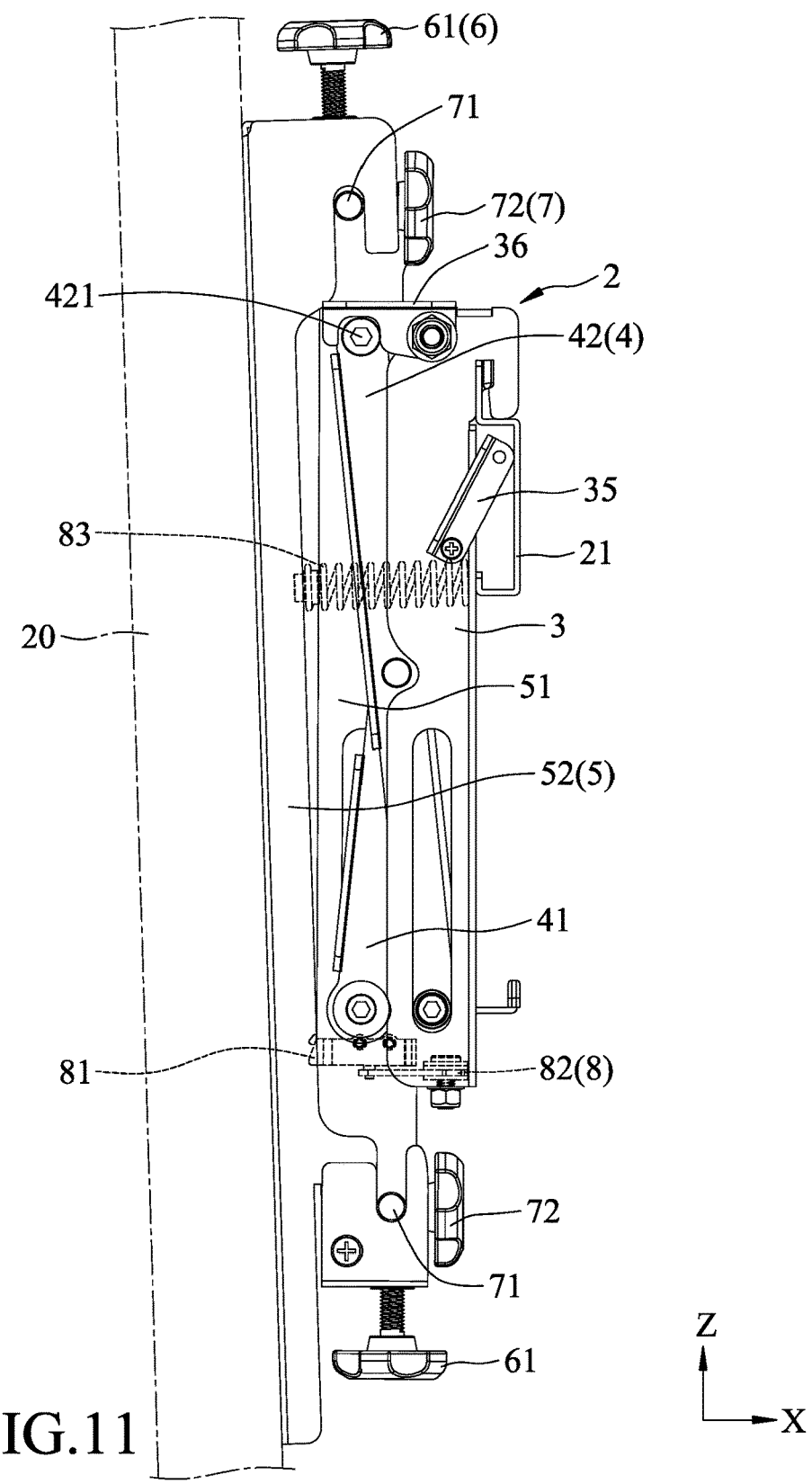
FIG. 11 is a schematic side view of FIG. 10.

Referring to FIGS. 10, 11, in combination with FIG. 1, the slide member 82 is slidably engageable with the guide member 81 so as to move the supporting unit 2 between a folded state and an unfolded state.

In the folded state, as shown in FIGS. 10 and 11, the slide member 82 is engaged with the engaging portion 814 of the guide member 81 (see FIG. 8), the second support frame 5 is proximate to the first support frame 3, the first and second linkage rods 41, 42 are pressed between the first and second support frames 3, 5 such that the first pivot bolt 411 and the first slide bolt 412 are respectively proximate to the second pivot bolt 421 and the second slide bolt 422, the resilient member 83 is compressed between the first and second support frames 3, 5 to store a biasing force, and the retaining member 36 is engaged to one end of the second pivot bolt 421 so as to further secure the supporting unit 2 in the folded state.

In the unfolded state, as shown in FIG. 1, the slide member 82 slides out of the open end 812 of the guide member 81 along the annular sliding path (P) (see FIG. 6), and the first and second support frames (3, 5) are biased by the biasing force of the resilient member 83 to move away from each other. In this state, the first pivot bolt 411 and the first slide bolt 412 are distal from the second pivot bolt 421 and the second slide bolt 422, respectively.

Figure 7:
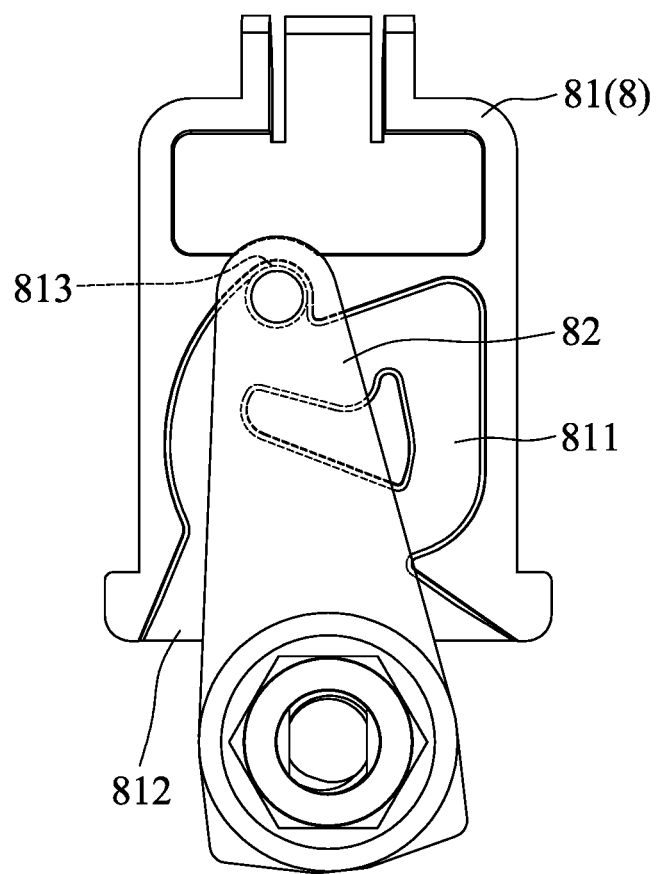
FIG. 7 is a view similar to FIG. 6, but illustrating the slide member sliding to a first abutment portion of the guide member.
Figure 8:
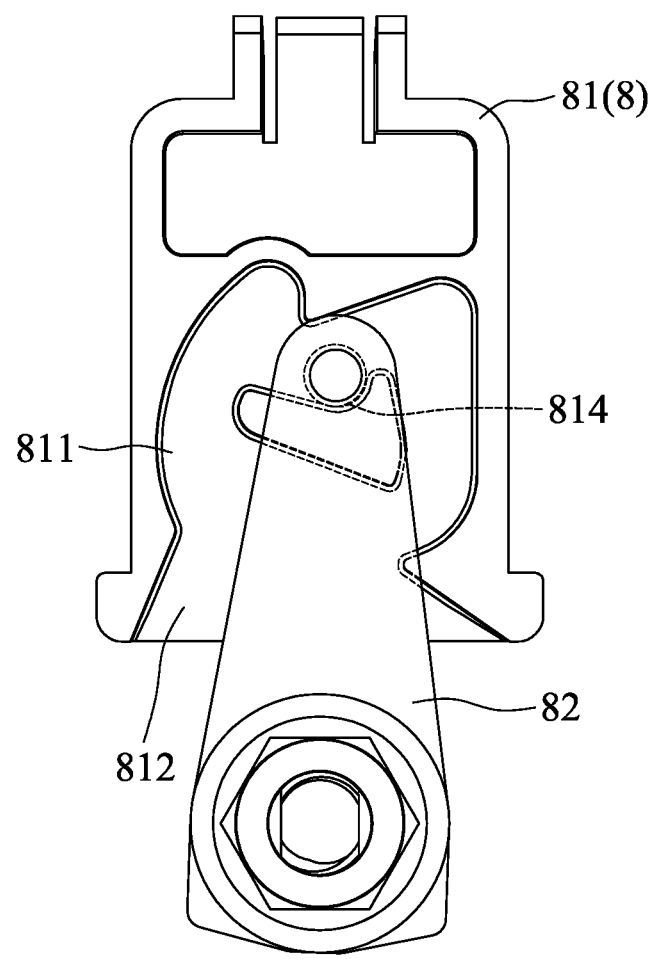
FIG. 8 is a view similar to FIG. 7, but illustrating the slide member sliding to an engaging portion of the guide member.
Figure 9:
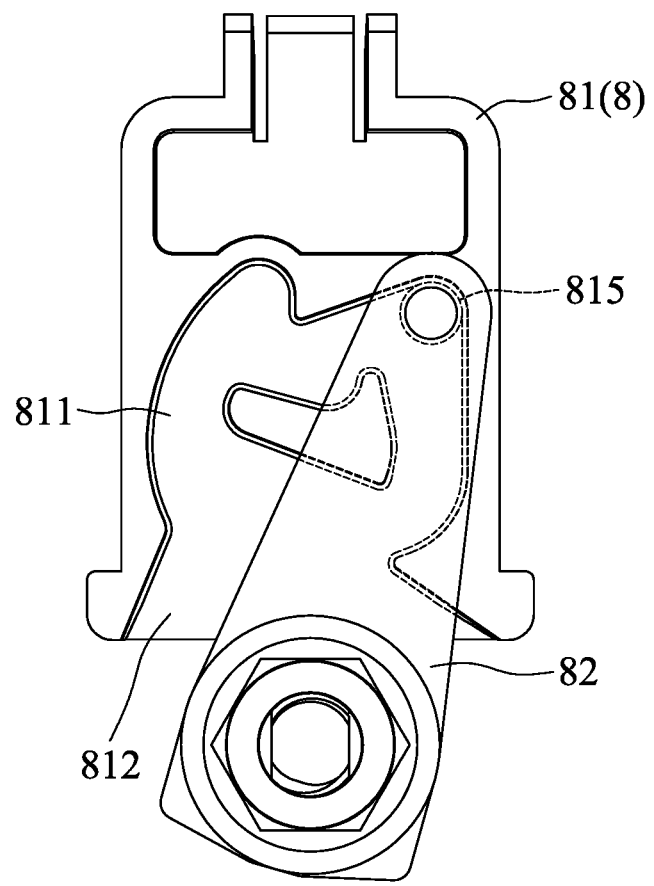
FIG. 9 is a view similar to FIG. 8, but illustrating the slide member sliding to a second abutment portion of the guide member.

To switch the supporting unit 2 from the unfolded state to the folded state, the second support frame 5 is pushed toward the first support frame 3 along the second direction (X) until the slide member 82 enters the sliding groove 811 via the open end 812 (see FIG. 6) and abuts against the first abutment portion 813 (see FIG. 7). The pushing of the second support frame 5 is stopped, and the resilient member 83 slightly biases the second support frame 5 away from the first support frame 3 so as to move the slide member 82 away from the first abutment portion 813 along the annular sliding path (P) until it engages the engaging portion 814 (see FIG. 8), thereby retaining the second support frame 5 close to the first support frame 3. To switch the supporting unit 2 from the folded state to the unfolded state, the second support frame 5 is pushed toward the first support frame 3 so as to move the slide member 82 away from the engaging portion 814 and abuts against the second abutment portion 815 (see FIG. 9). The pushing of the second support frame 5 is stopped, and the slide member 82 moves out of the open end 812 of the guide member 81, thereby permitting movement of the first and second support frames 3, 5 away from each other.

Figure 12:
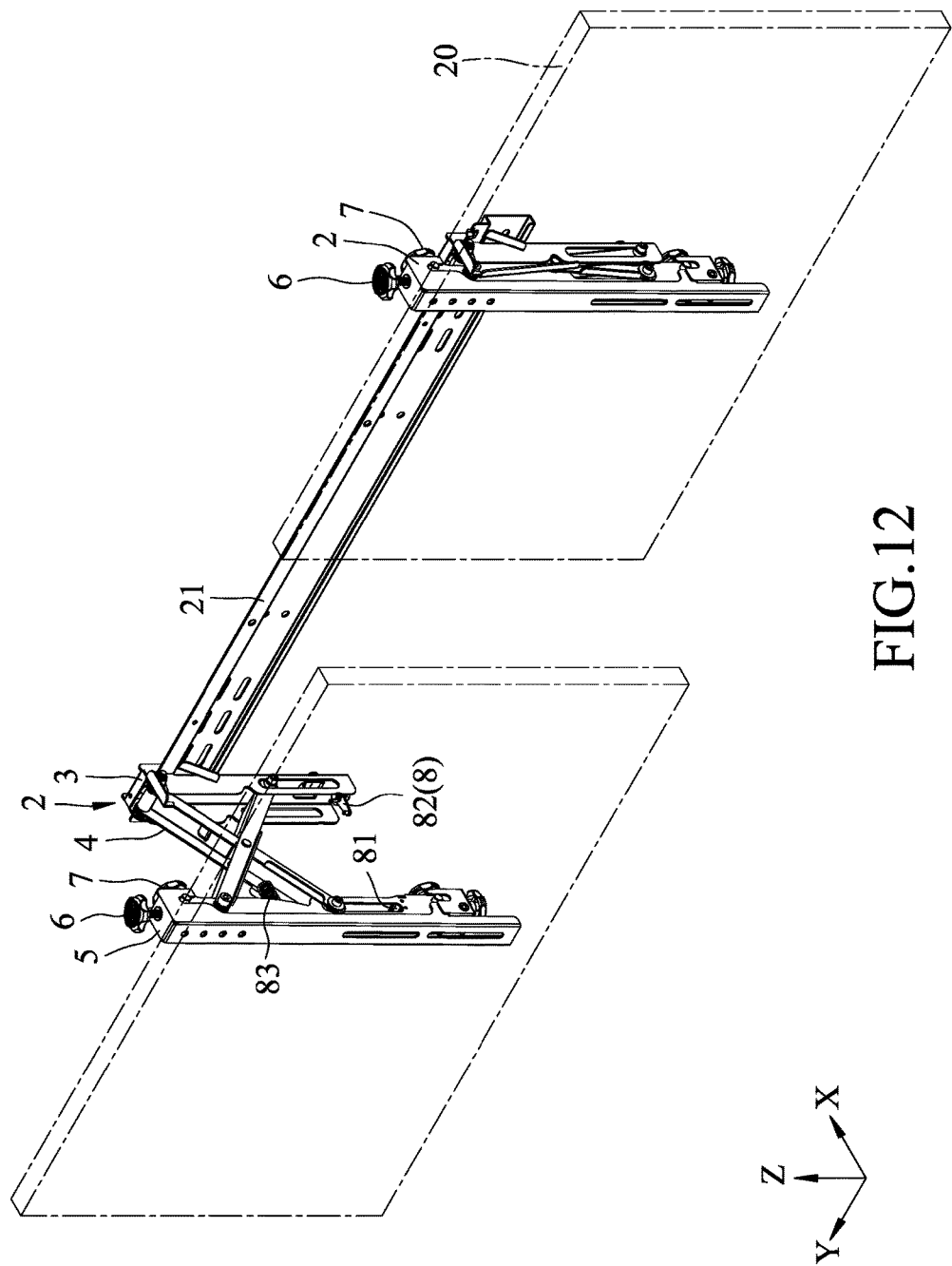
FIG. 12 illustrates two display supporting apparatuses of this disclosure connected to a wall-hanging frame.

The display supporting apparatus of this disclosure is suitable to be installed on a wall-hanging frame 21 (see FIG. 12). The wall-hanging frame 21 extends horizontally, and is generally disposed on a wall surface or an outdoor supporting frame. To mount the display supporting apparatus of this disclosure on the wall-hanging frame 21, the hook-engaging plates 33 of the first support frame 3 are hooked to the wall-hanging frame 21, and the abutment member 35 is pivoted toward and abuts against the wall-hanging frame 21, so that the first support frame 3 is supported on and will not fall from the wall-hanging frame 21. Because of the presence of the roller 34 between the hook-engaging plates 33, the first support frame 3 can slide horizontally along the wall-hanging frame 21 to adjust the position of the supporting unit 2 relative to the wall-hanging frame 21. Hence, the display supporting apparatus of this disclosure can be adjustably mounted on the wall-hanging frame 21.

The support body 52 is provided for mounting the display 20 thereon, and can permit adjustment of the position and inclination of the display 20. By rotating the first adjustable members 61, the position of the display 20 along the first direction (Z) can be adjusted, and by rotating the second adjustable members 72, the position of the display 20 along the second direction (X) can be adjusted. When one of the second adjustable members 72 is adjusted, the display 20 is moved to incline with respect to the adjustable body 51, as exemplified in FIG. 11.

FIG. 12 illustrates two spaced-apart display supporting apparatuses of this disclosure are mounted on the wall-hanging frame 21, with the supporting unit 2 of one of the display supporting apparatuses in the folded state, and the supporting unit 2 of the other display supporting apparatus in the unfolded state.

Figure 13:
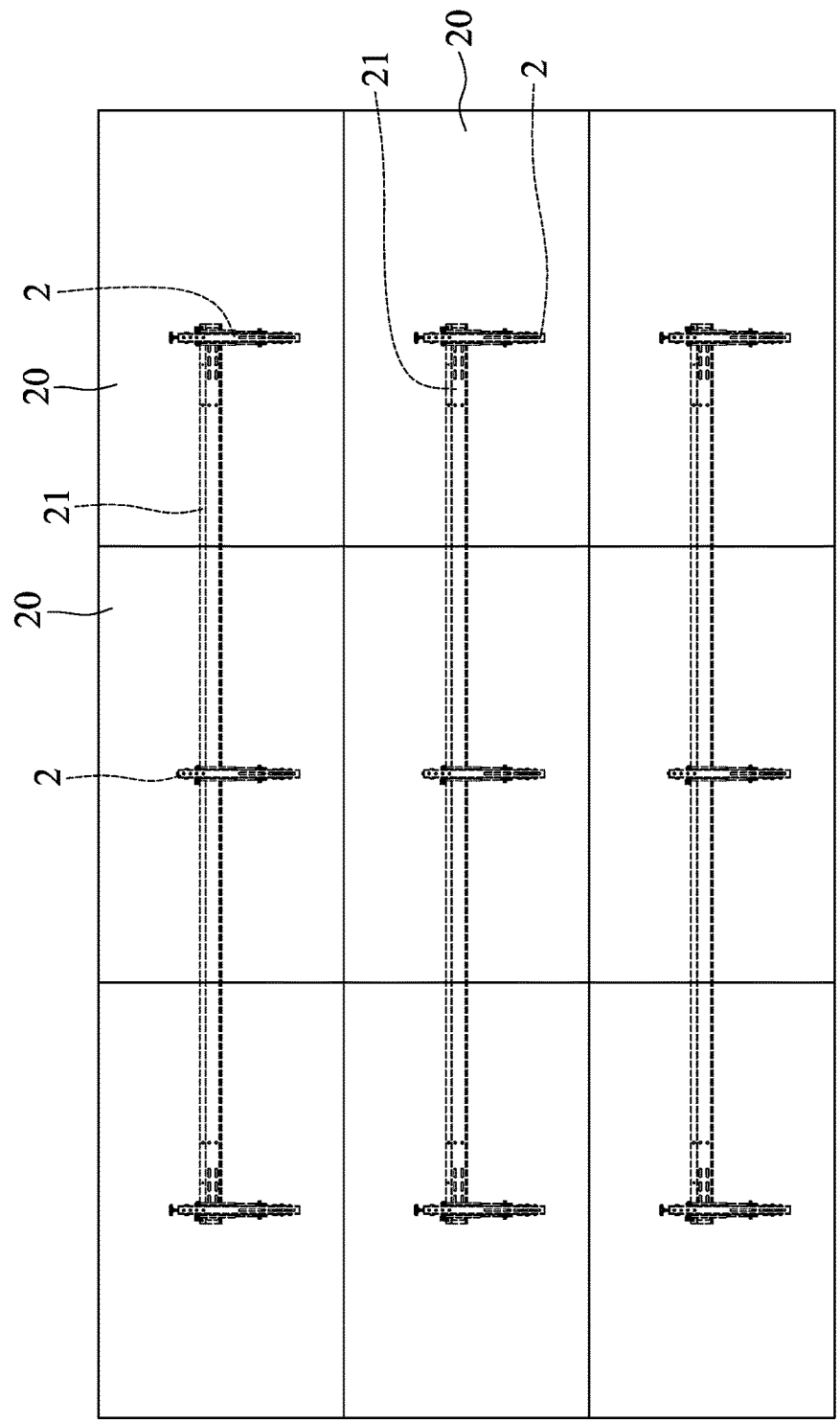
FIG. 13 illustrates three arrays of the display supporting apparatuses of this disclosure and a plurality of displays respectively mounted on the display supporting apparatuses.

Referring to FIG. 13, a plurality of arrays of the display supporting apparatuses of this disclosure are mounted on the corresponding wall-hanging frame 21, and a plurality of the displays 20 are respectively mounted on the display supporting apparatuses. There is no gap between two adjacent ones of the displays 20 by adjusting the first and second adjusting units 6, 7. If one of the displays 20 has to be repaired, the retaining member 36 is disengaged from the one end of the second pivot bolt 421, after which the damaged display 20 is pushed to move the second support frame 5 toward the first support frame 3. At this time, the slide member 82 is disengaged from the guide member 81 through the annular sliding path (P) so as to switch the supporting unit 2 supporting the damaged display 20 from the folded state to the unfolded state. The damaged display 20 can thus protrudes away from the other displays 20, and can be conveniently removed for repair or replacement. After the display 20, which is repaired or is replaced by a new one, is mounted on the second support frame 5, it is pushed to move the second support frame 5 toward the first support frame 3 until the slide member 82 enters the sliding groove 811 and engages the engaging portion 814 of the guide member 81 through the biasing force of the resilient member 83, thereby retaining the supporting unit 2 in the folded state. As shown in FIG. 13, the displays 20 are arranged in a 3×3 array. When the positions of the displays 20 are irregularly arranged, by using the display supporting apparatuses of this disclosure, the position and inclination of the displays 20 can be adjusted one by one so as to place the displays 20 on a same plane. To repair a damaged middle one of the displays 20, the supporting unit 2 supporting the damaged middle display 20 is switched to the unfolded state so as to facilitate removal of the damaged middle display 20 for repair or replacement.

Figure 14:
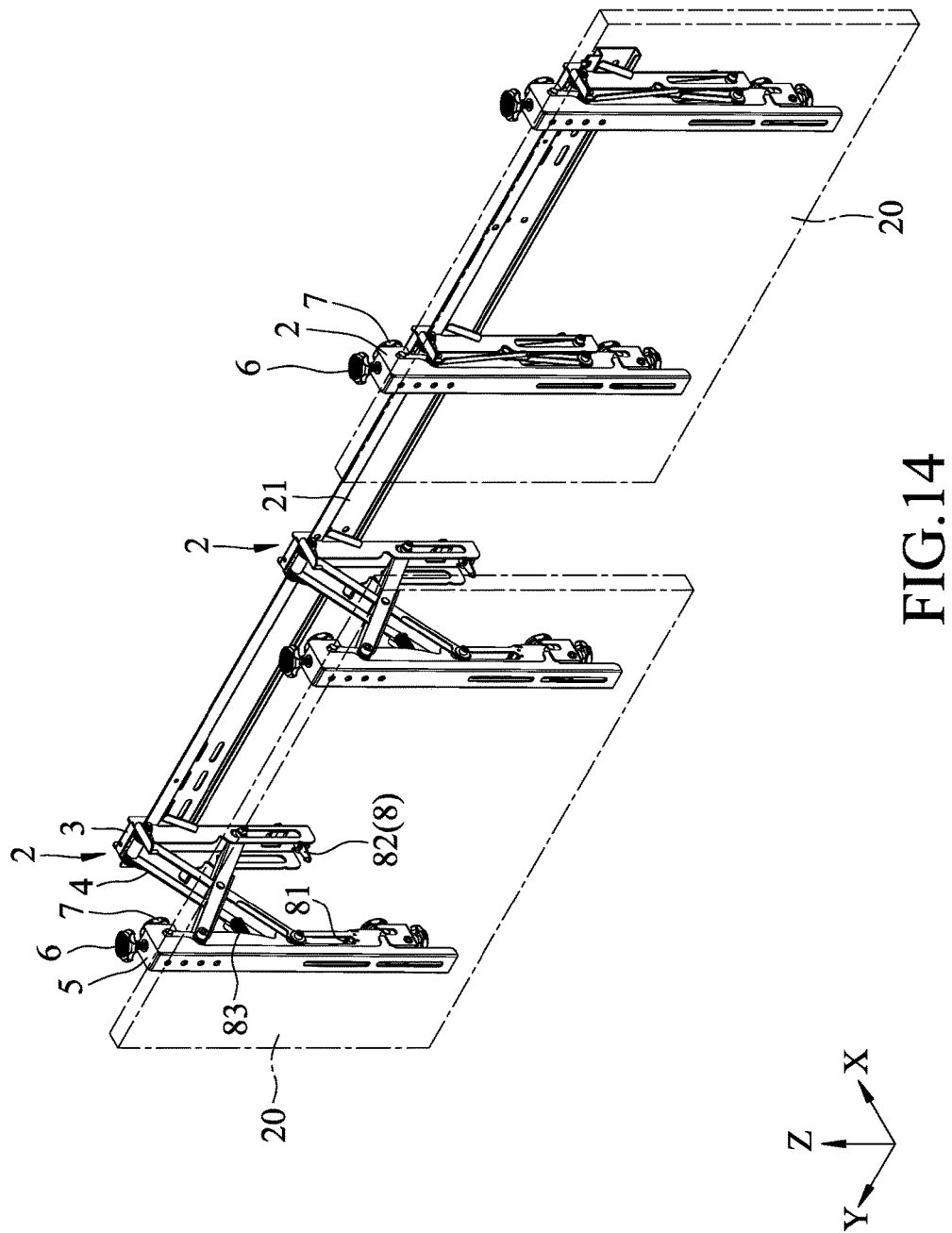
FIG. 14 illustrates two pairs of the display supporting apparatuses of this disclosure, each pair of which supports a display.
Figure 15:
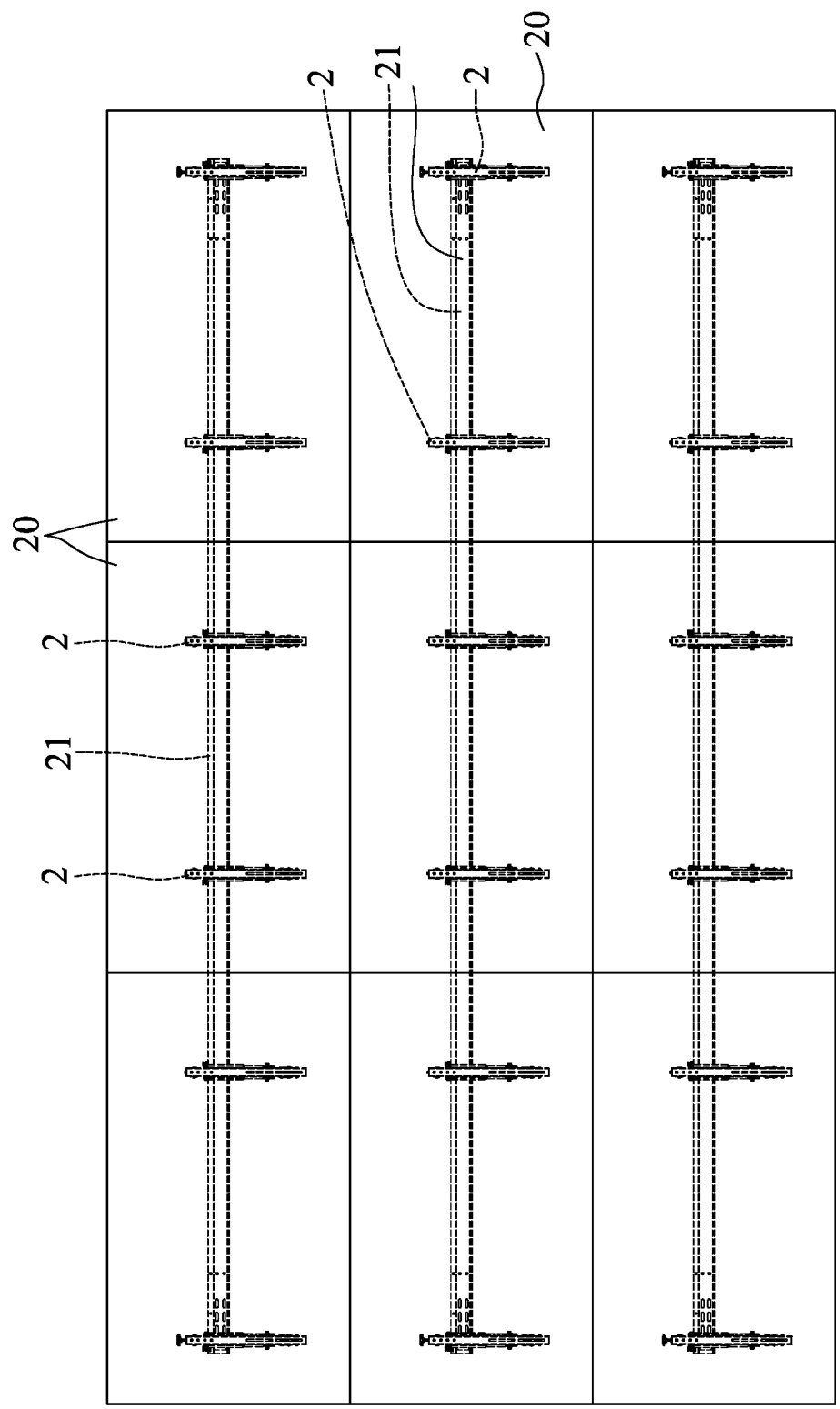
FIG. 15 illustrates three arrays of pairs of the display supporting apparatuses of this disclosure and a plurality of displays each of which is supported by a respective pair of the display supporting apparatuses.

Referring to FIGS. 14 and 15, each display 20 can be simultaneously supported by two display supporting apparatuses of this disclosure. By pressing the display 20, the two supporting units 2 supporting the same can be synchronously moved. The movements of the supporting units 2 are similar to that when the supporting unit 2 supports only one display 20. The use of the two display supporting apparatuses of this disclosure can more stably secure the display 20 thereon.

It is worth to mention herein that the resilient mechanism 8 may be omitted when the display supporting apparatus of this disclosure supports one or more displays 20. That is, the display supporting apparatus of this disclosure can be simplified to include only the supporting unit 2, and the first and second adjusting units 6, 7. The effect of adjusting the position and inclination of the display 20 may be similarly achieved.

In some cases, if the position of the display 20 is fixed, only a biasing function is required to facilitate removal of the display 20. That is, the display supporting apparatus of this disclosure can be simplified to include only the supporting unit 2 and the resilient mechanism 8, and the structure of the second support frame 5 may be simplified.

The advantages and effects of the display supporting apparatus of this disclosure can be summarized as follows:

1. In comparison with the conventional display 20 which is mostly disposed in proximity to the wall-hanging frame 21 or the wall surface, through the presence of the resilient mechanism 8 on the display supporting apparatus of this disclosure, the space between the display 20 and the wall-hanging frame 21 can be increased to facilitate removal, replacement or adjustment of the display 20. The display 20 is pushed to move close to the wall-hanging frame 21 after it is repaired, replaced or adjusted.

2. Through the first and second adjusting units 6, 7, the position and inclination of the display 20 can be adjusted accordingly.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A display supporting apparatus comprising:
    a supporting unit including a first support frame, a second support frame for mounting a display thereon, and a linkage mechanism pivotally connected to and disposed between said first and second support frames; and
    a resilient mechanism including a guide member mounted on one of said first and second support frames, a slide member pivotally connected to the other one of said first and second support frames, and a resilient member, said slide member being removably and slidably engageable with said guide member;
    wherein said supporting unit is operable between a folded state, in which said first and second support frames are moved toward each other, and an unfolded state, in which said first and second support frames are moved away each other;
    wherein, when said supporting unit is in the folded state, said slide member is engaged with said guide member, said second support frame is proximate to said first support frame, and said resilient member is compressed between said first and second support frames to store a biasing force; and
    wherein, when said supporting unit is in the unfolded state, said slide member is disengaged and separated from said guide member, and said first and second support frames are biased by the biasing force of said resilient member to move away from each other.

2. The display supporting apparatus as claimed in claim 1, wherein:
    said guide member has a sliding groove defined by a groove bottom wall and a groove surrounding wall extending outwardly and transversely from said groove bottom wall, and a projection member projecting from said groove bottom wall into said sliding groove and spaced apart from said groove surrounding wall, said sliding groove having an open end, said projection member having an engaging portion;
    said slide member is engaged to said engaging portion when said first and second support frames are moved toward each other to retain said supporting unit in the folded state; and
    when one of said first and second support frames is pushed toward the other one of said first and second support frames, said slide member is moved to disengage from said engaging portion, thereby permitting movement of said first and second support frames away from each other so as to switch said supporting unit from the folded state to the unfolded state.

3. The display supporting apparatus as claimed in claim 2, wherein said projection member cooperates with said groove surrounding wall to form an annular sliding path, said open end of said sliding groove communicating with said annular sliding path, said groove surrounding wall having a first abutment portion and a second abutment portion spaced apart from said first abutment portion, said slide member being slidable in said sliding groove along said annular sliding path, said annular sliding path extending from said open end through said first abutment portion, through said engaging portion, through said second abutment portion, and back to said open end, said engaging portion and said open end being spaced at a distance smaller than that between said first abutment portion and said open end and that between said second abutment portion and said open end.

4. The display supporting apparatus as claimed in claim 3, wherein said first support frame has a retaining member releasably engaged to said second support frame through said linkage mechanism to further secure said supporting unit in the folded state, said guide member and said resilient member being mounted on said second support frame spaced apart from each other, said slide member being mounted on said first support frame.

5. The display supporting apparatus as claimed in claim 1, wherein:
said supporting unit is configured to be connected to a wall-hanging frame; and
said first support frame has a connection body, two spaced-apart hook-engaging plates extending transversely and then downwardly from a top end of said connection body, a roller rotatably disposed on said connection body between said hook-engaging plates, and an abutment member pivoted to one lateral side of said connection body;
said hook-engaging plates are configured to engage with the wall-hanging frame when said supporting unit is connected to the wall-hanging frame; and
said abutment member is configured to pivot toward and abut against the wall-hanging frame when said supporting unit is connected to the wall-hanging frame.

6. The display supporting apparatus as claimed in claim 1, wherein said first support frame has two first grooves extending along the length thereof, said second support frame having two second grooves extending along the length thereof, said linkage mechanism including first and second linkage rods intersecting each other, said first linkage rod having a first pivot bolt pivotally connected to said first support frame, and a first slide bolt having two opposite ends disposed slidably and respectively in said second grooves, said second linkage rod having a second pivot bolt pivotally connected to said second support frame, and a second slide bolt having two opposite ends disposed slidably and respectively in said first grooves.

7. The display supporting apparatus as claimed in claim 1, further comprising first and second adjusting units, said second support frame including a support body, and an adjustable body received in said support body, said first adjusting unit including two first adjustable members that extend respectively and movably through top and bottom ends of said support body and that respectively abut against top and bottom ends of said adjustable body, said second adjusting unit including two sliding rods each movably extending through two opposite lateral sides of said support body and two opposite lateral sides of said adjustable body, and two second adjustable members each extending through and rotatable relative to said adjustable body, each of said sliding rods being sleeved on and being driven by a respective one of said second adjustable members to move along the second direction, said support body being driven by said sliding rods to move along the second direction so as to incline with respect to said adjustable body when the respective one of said second adjustable members is operated.

8. A display supporting apparatus comprising:
a supporting unit including a first support frame, a second support frame for mounting a display thereon, and a linkage mechanism pivotally connected to and disposed between said first and second support frames; and
a resilient mechanism including a guide member mounted on one of said first and second support frames, a slide member pivotally connected to the other one of said first and second support frames, and a resilient member, said slide member being removably and slidably engageable with said guide member;
wherein said supporting unit is operable between a folded state, in which said first and second support frames are moved toward each other, and an unfolded state, in which said first and second support frames are moved away each other;
wherein, when said supporting unit is in the folded state, said slide member is engaged with said guide member, said second support frame is proximate to said first support frame, and said resilient member is compressed between said first and second support frames to store a biasing force;
wherein, when said supporting unit is in the unfolded state, said slide member is disengaged from said guide member, and said first and second support frames are biased by the biasing force of said resilient member to move away from each other; and
wherein:
said guide member has a sliding groove defined by a groove bottom wall and a groove surrounding wall extending outwardly and transversely from said groove bottom wall, and a projection member projecting from said groove bottom wall into said sliding groove, said sliding groove having an open end, said projection member having an engaging portion;
said slide member is engaged to said engaging portion when said first and second support frames are moved toward each other to retain said supporting unit in the folded state; and
when one of said first and second support frames is pushed toward the other one of said first and second support frames, said slide member is moved to disengage from said engaging portion, thereby permitting movement of said first and second support frames away from each other so as to switch said supporting unit from the folded state to the unfolded state.

9. A display supporting apparatus comprising:
a supporting unit including a first support frame, a second support frame for mounting a display thereon, and a linkage mechanism pivotally connected to and disposed between said first and second support frames; and
a resilient mechanism including a guide member mounted on one of said first and second support frames, a slide member pivotally connected to the other one of said first and second support frames, and a resilient member, said slide member being removably and slidably engageable with said guide member;

wherein said supporting unit is operable between a folded state, in which said first and second support frames are moved toward each other, and an unfolded state, in which said first and second support frames are moved away each other;

wherein, when said supporting unit is in the folded state, said slide member is engaged with said guide member, said second support frame is proximate to said first support frame, and said resilient member is compressed between said first and second support frames to store a biasing force;

wherein, when said supporting unit is in the unfolded state, said slide member is disengaged from said guide member, and said first and second support frames are biased by the biasing force of said resilient member to move away from each other; and wherein:

said supporting unit is configured to be connected to a wall-hanging frame;

said first support frame has a connection body, two spaced-apart hook-engaging plates extending transversely and then downwardly from a top end of said connection body, a roller rotatably disposed on said connection body between said hook-engaging plates, and an abutment member pivoted to one lateral side of said connection body;

said hook-engaging plates are configured to engage with the wall-hanging frame when said supporting unit is connected to the wall-hanging frame; and said abutment member is configured to pivot toward and abut against the wall-hanging frame when said supporting unit is connected to the wall-hanging frame.

* * * * *